(12) United States Patent
Fabvier

(10) Patent No.: US 8,673,109 B2
(45) Date of Patent: Mar. 18, 2014

(54) METHOD OF MAKING A LAYERED BITUMINOUS MEMBRANE, AND AN APPARATUS THEREFOR

(75) Inventor: Bruno Fabvier, Antony Cedex (FR)

(73) Assignee: Icopal Danmark A/S, Herlev (DK)

( * ) Notice: Subject to any disclaimer, the term of this patent is extended or adjusted under 35 U.S.C. 154(b) by 0 days.

(21) Appl. No.: 13/580,347

(22) PCT Filed: Feb. 22, 2011

(86) PCT No.: PCT/EP2011/052601
§ 371 (c)(1),
(2), (4) Date: Oct. 30, 2012

(87) PCT Pub. No.: WO2011/101490
PCT Pub. Date: Aug. 25, 2011

(65) Prior Publication Data
US 2013/0042977 A1  Feb. 21, 2013

(30) Foreign Application Priority Data
Feb. 22, 2010  (EP) .................................... 10154228

(51) Int. Cl.
*B32B 37/12*  (2006.01)
*B32B 37/08*  (2006.01)
*B32B 37/10*  (2006.01)

(52) U.S. Cl.
USPC .......................................... 156/337; 156/497

(58) Field of Classification Search
USPC ................................................ 156/337, 497
See application file for complete search history.

(56) References Cited

U.S. PATENT DOCUMENTS

| 2,199,660 A | * | 5/1940 | Eichhorn ....................... 264/293 |
| 3,091,898 A | | 6/1963 | Fasold et al. |
| 2008/0119591 A1 | * | 5/2008 | Falkiewicz et al. .............. 524/68 |

FOREIGN PATENT DOCUMENTS

| DE | 2218272 A1 | 10/1973 |
| DE | 8432277 U1 | 10/1987 |
| EP | 1323878 A1 | 7/2003 |
| FR | 2544361 A3 | 10/1984 |
| WO | 9100945 A1 | 1/1991 |
| WO | WO 9100945 A | * 1/1991 |
| WO | 0220267 A1 | 3/2002 |

OTHER PUBLICATIONS

PCT International Search Report issued in International Application No. PCT/EP2011/052601, issued Apr. 6, 2011, 3 pages.
International Preliminary Report on Patentability issued in PCT International Application No. PCT/EP2011/052601, issued May 30, 2012, 7 pages.
Extended European Search Report received for European Patent Application No. 10154228.0, mailed on Jul. 23, 2010, 7 pages.

* cited by examiner

*Primary Examiner* — Michael Orlando
*Assistant Examiner* — Daniel Lee
(74) *Attorney, Agent, or Firm* — Morrison & Foerster LLP

(57) ABSTRACT

The invention relates to a method of making a grooved reinforced layered bituminous membrane (1) comprising the steps of: providing a web (A) of a reinforcing material, applying a layer (3) of a hot liquid adhesive, and applying a roller (10) having a surface pattern of grooves onto said layer (3) of an adhesive, to form a pattern of grooves (4) in the surface of said layer an adhesive.

17 Claims, 2 Drawing Sheets

METHOD OF MAKING A LAYERED BITUMINOUS MEMBRANE, AND AN APPARATUS THEREFOR

CROSS REFERENCE TO RELATED APPLICATIONS

Figure 1:
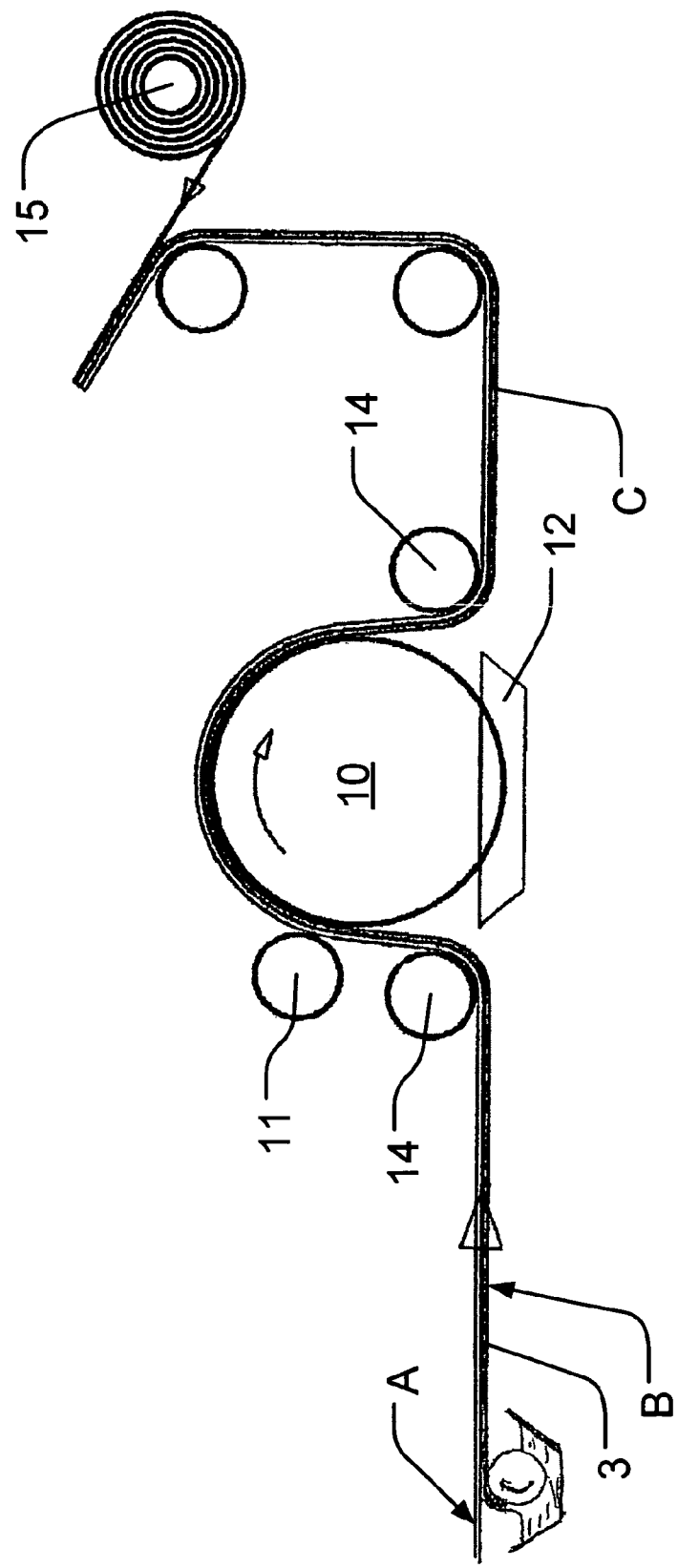

This is a U.S. National Phase patent application of PCT/EP2011/052601, filed Feb. 22, 2011, which claims priority to the European Patent Application No. 10154228.0, filed Feb. 22, 2010, each of which is hereby incorporated by reference in the present disclosure in its entirety.

The present invention relates to a method of making a layered bituminous membrane with a surface pattern of grooves, for covering a building structure, such as a building roof.

Layered bituminous membranes with a surface pattern aiming at enhancing better, faster and easier full melting of the torching film, as well as a faster and easier melting of the bitumen during application by torching on the substrate are known, see e.g. WO 91/00945. The present inventors have developed an improved method of making such a surface pattern whereby it is ensured that the grooves will remain stable without becoming flattened during the production of the membrane.

This is achieved through the steps of applying a layer of a hot liquid adhesive on a web of a reinforcing material and then applying a roller having a surface pattern of grooves against the layer of an adhesive, to form the pattern of grooves in the surface of the layer of an adhesive. The web may have been bitumen impregnated prior to applying the hot liquid adhesive.

According to one embodiment of the invention where the adhesive is a heat-activatable bitumen applied at the usual temperature as required for bitumen coating, well above its melting point, in the range of 160 to 200° C., the layer of adhesive bitumen is subsequently cooled to a temperature of below its melting point defined by its ring and ball temperature, typically about 120° C. for APP modified bitumen, about 100° C. for SBS modified bitumen, about 80° C. for oxidized bitumen, before and/or while applying the roller onto the layer of adhesive bitumen. In such case the roller may be cooled by a cooling agent such that the cooling primarily is brought about by the roller. A slip agent, such as water is applied between the roller and the layer of an adhesive, to prevent the layer of adhesive from sticking to the roller. The slip agent may contain a detergent.

A suitable apparatus for practising the method according to the invention is also claimed.

An exemplary embodiment of the invention will now be explained in further details with reference to the drawing.

Figure 2:
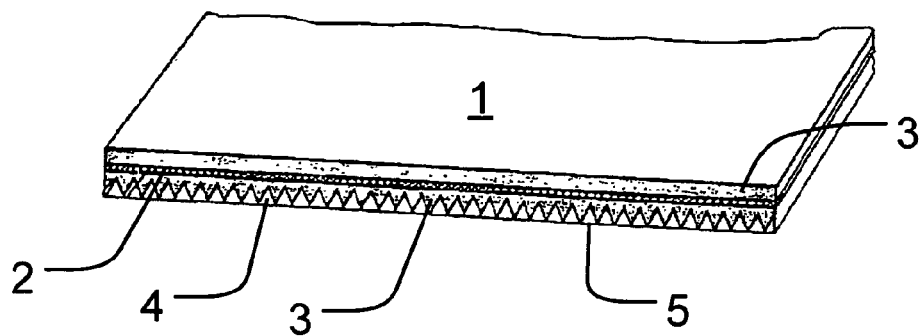
Figure 3:
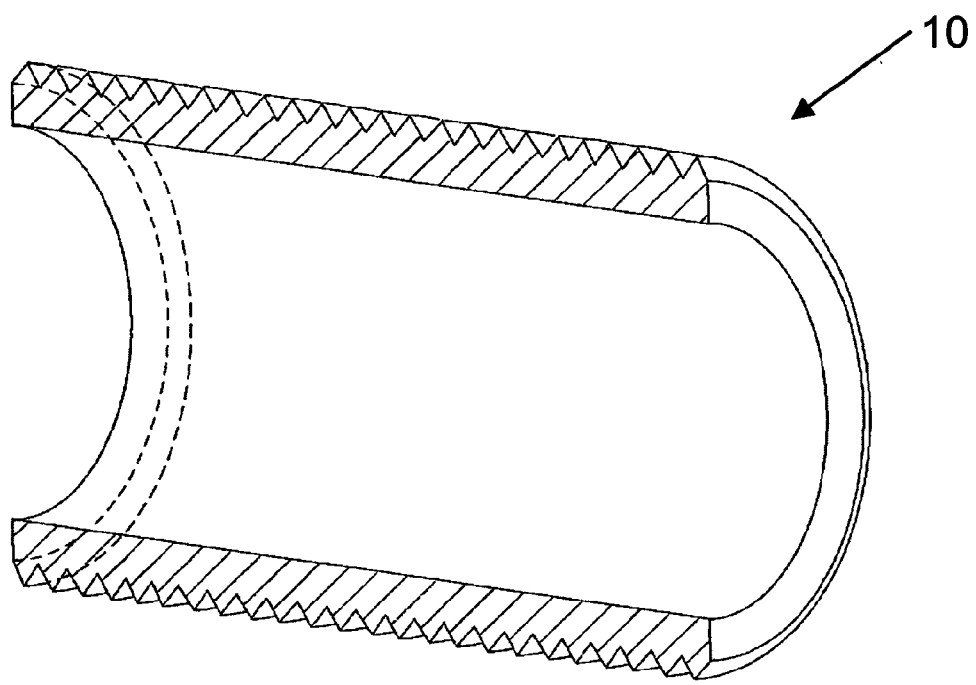

FIG. 1 shows a schematic side view of an apparatus for practising the method according to the invention, FIG. 2, shows a schematic perspective view of a protective bituminous membrane made in accordance with the invention, and FIG. 3 shows a partial cross-sectional view of a roller for providing the surface pattern.

In FIG. 2 numeral 1 refers to a layered bituminous membrane suitable for protective watertight covering of a building structure. The membrane 1 is suitable for being adhered to a building structure by "welding", that is, by directing in-situ a heat source, such as a torch, against the lower surface of the membrane 1 on rolling out the membrane 1 onto the structure.

The membrane 1 comprises a core formed by a web 2 of a reinforcing material, such as but not limited to a synthetic felt material or a glass-fibre fleece which may or may not pre-impregnated by a bituminous material. A layer 3 of heat-activatable adhesive bitumen has been applied onto one surface of the web 2, and a plastics material film 5 has been applied onto the surface of the layer 3 to allow the web to be rolled up and to be un-wound. A series of parallel grooves 4 formed in the surface of the lower layer 3 extend along the length of the membrane 1.

On applying the membrane using a torch the plastics material film 5 melts away fast and completely since there is air trapped in the bottom of the grooves, and the lower layer of bitumen 3 reaches the temperature at which it becomes strongly adherent following which the membrane is applied against the building structure whereby the heated lower layer 3 of bitumen will adhere to the surface of the building structure thus keeping the membrane 1 in place. In addition, the grooves permit a faster torching thanks to an enhanced surface for heat exchange.

It is noted that a layer of sand, or a layer of an acrylic polymer with a granular pigment, may be provided on the surface of the membrane 1 opposite the layer 3, possibly with an intermediate bituminous layer. In addition, a layer of sand, or a layer of an acrylic polymer with a granular pigment, may be provided between reinforcing web A and the layer 3. This is of particular advantage where a product as disclosed in WO 02/20267 is to be manufactured, i.e. where the layer 3 is applied in the shape of regularly spaced stripes, in which case it is preferred that the pattern of grooves is formed on at least 90%, or all, of the stripes.

It will be understood that the layer 3 of bitumen defines an adhesive bitumen in the sense that this layer will melt and adhere readily to a substrate, such as a concrete a wooden structure, an insulating board or any another bituminous membrane, including another grooved membrane, such as one according to the present invention.

In FIG. 1, a web A of a reinforcing material, bitumen impregnated or not, has been coated by a contact roller with a layer 3 of an adhesive bitumen in order to provide a web B; the web B is guided further on from roller 14 to a pattern roller 10 which is partly immersed in vessel 12.

A layer (not shown) of a bituminous material optionally having other properties than the material for the layer 3 may have been applied between the layer 3 and the web A; in one embodiment the web A is a bitumen impregnated web, impregnated through the use of a material similar or identical to the material forming layer 3.

The pattern roller 10 is supplied with a cooling agent running in suitable tubing inside the roller 10 to cool the surface of the roller 10 to a temperature of below 50° C., for instance, about 8° C. Pressure rollers 11 press the web B against the surface of the roller 10, and the lower surface of the web B will thereby sharply cool to a reduced temperature which is selected to be below the temperature at which the bitumen of layer 3 changes from the liquid form, that is, less than the Ring and Ball softening point of the adhesive bitumen.

Pattern roller 10 is provided with a pattern of grooves milled, etched or otherwise formed in the surface thereof, and an image of this pattern is formed in the surface of lower layer 3 as the web B is conveyed forward pressed against the roller 10 that rotates along with the web B. Through the sharp temperature reduction of the web B the pattern of grooves 4 formed in the surface of web B will remain stable in that the grooves will not collapse but rather remain open along the entire length of the part C of the web which is conveyed from roller 14 towards a downstream arranged roller 15 applying a plastics material film onto the lower, grooved surface of the web C.

To increase slippage between the web B and roller 10 the vessel 12 may be filled with a liquid slip agent, such as water, which may be admixed with any commonly available detergent, which as the roller 10 rotates is transferred to the surface of the roller 10 and which, hence, provides a thin liquid layer between the web B and surface of the roller 10. The slip agent may be cooled, or may have the temperature of the ambient. The slip agent may alternatively be applied by spraying.

It is noted that also the roller 14 may be supplied with a cooling agent to provide an additional or alternative cooling of the web B. Also, the slip agent may alternatively be sprayed directly onto the lower surface of web B before it contacts pattern roller 10.

FIG. 3 shows a partial cross-sectional view not to scale of the roller 10, showing the adjacent peripherally extending grooves 3' forming the grooves 3 in the web B. The grooves 3' may be defined by side walls meeting at an acute angle of e.g. 15°-60°.

Example 1

Web Material A: Glass Fleece, Impregnated

Composition of bitumen adhesive layer 3: bitumen 61.6% SBS, 8.4% limestone filler 30%, with a Ring and Ball softening point of 133° C.° C.,—coated web B had a temperature of 100° C.° C. when leaving roller 10

Example 2

Web Material A: Polyester Non Woven, Impregnated

Composition of bitumen adhesive layer 3: bitumen 58%, SBS, APP 15%, IPP 2%, limestone filler 25%, with a Ring and Ball softening point of 150° C., coated web B had a temperature of 90° C.° C. when leaving roller 10, and had on top approx. 1,000 g/m² of slates

The invention claimed is:

1. A method of making a layered reinforced bituminous membrane comprising the steps of:
   a) providing a web of a reinforcing material,
   b) applying a layer of a hot bituminous liquid adhesive, and
   c) applying a roller having a surface pattern of grooves against said layer of adhesive, to form a pattern of grooves in the lower surface of said reinforced bituminous membrane, wherein said layer of adhesive is being cooled to a temperature of below the Ring and Ball softening point of said adhesive, while applying said roller against said layer of adhesive,
   after step c), applying a plastic film onto said layer of adhesive having said pattern of grooves,
   applying a slip agent between said roller and said layer of adhesive, to reduce any tendency of said adhesive to stick to said roller, and
   blowing cooling air onto said layer of adhesive having said pattern of grooves to evaporate said slip agent before application of said plastic film.

2. The method of claim 1, wherein said adhesive is heat-activatable.

3. The method according to claim 1 wherein a layer of a bituminous material is applied directly onto a first surface of said web and wherein said layer of adhesive is applied directly onto said layer of a bituminous material.

4. The method according to claim 1 wherein said web of a reinforcing material is impregnated with a bituminous material before step b).

5. The method according to claim 1, wherein said pattern of grooves in the lower surface of said reinforced bituminous membrane is an image formed by said surface pattern of grooves of said roller.

6. The method according to claim 1, wherein said layer of adhesive has a temperature in the range of 160° C.-200° C. when applied.

7. The method according to claim 1, wherein the surface temperature of said layer of adhesive is cooled to a temperature in the range of 60° C.-120° C.

8. The method according to claim 7 wherein the surface temperature of said layer of adhesive bitumen is cooled to a temperature in the range of 70° C.-100° C.

9. The method according to claim 1 wherein said roller is cooled by a cooling agent.

10. The method according to claim 9, wherein said roller has a surface temperature of 6° C.-50° C.

11. The method according to claim 1, wherein a detergent is added to said slip agent.

12. The method according to claim 1, wherein said grooves of said pattern of grooves formed in the surface of said layer of adhesive have a depth of 0.05-0.20 mm.

13. The method according to claim 1, wherein said grooves of said roller extend along the periphery of said roller.

14. A method according to claim 1, wherein said layer of adhesive is applied onto at least 90% of the width of said web of a reinforcing material.

15. A method according to claim 1, wherein said pattern of grooves is formed on at least 90% of the width perpendicular to the longitudinal direction of said web of said layer of adhesive.

16. A method according to claim 1, wherein said layer of adhesive is applied onto at least 40% of the width of said web perpendicular to the longitudinal direction of said web, in regularly spaced longitudinal stripes.

17. A method according to claim 16, wherein said pattern of grooves is formed on at least 90% of said regularly spaced longitudinal stripes of said layer of adhesive.

* * * * *